United States Patent [19]

Kervagoret

[11] 4,303,099

[45] Dec. 1, 1981

[54] DEVICE FOR HYDRAULICALLY ASSISTED STEERING

[75] Inventor: Gilbert Kervagoret, Argenteuil, France

[73] Assignee: Societe Anonyme DBA, Paris, France

[21] Appl. No.: 87,850

[22] Filed: Oct. 24, 1979

[30] Foreign Application Priority Data

Oct. 27, 1978 [FR] France ................................ 78 30653
Jun. 25, 1979 [FR] France ................................ 79 16315

[51] Int. Cl.³ .............................................. B62D 5/08
[52] U.S. Cl. ......................... 137/625.21; 137/625.47; 91/375 A
[58] Field of Search ............... 91/375 A, 375 R; 137/625.47, 625.46, 625.21, 625.22, 625.23, 625.24

[56] References Cited

U.S. PATENT DOCUMENTS 3,033,051 5/1962 Reinke ............................. 91/375 A X
3,807,456 4/1974 Colletti ........................... 91/375 A X

FOREIGN PATENT DOCUMENTS 2099895 of 1972 France .
2280538 of 1976 France .
2382361 of 1978 France .
2445255 of 1980 France .
 997065 of 1965 United Kingdom .

Primary Examiner—Alan Cohan
Attorney, Agent, or Firm—Paul David Schoenle; Ken C. Decker

[57] ABSTRACT

A device for hydraulically assisted steering of a motor vehicle, comprising a steering control member extended by a sleeve, a rotor and a torsion-bar connecting the rotor and the steering control member; the sleeve includes a first group of two pairs of passage means and the rotor includes a second group of two pairs of passage means each passage means of said second group being shaped such that it can communicate with two passage means belonging to two different pairs of said first group, a source of high pressure and a drain being permanently connected to a pair of passage means of one group, respectively, and the edges of passage means of at least one group, directed along the axis of the sleeve, having a non linear profile defined as a function of the characteristic $\Delta p = f(\theta)$ desired.

9 Claims, 12 Drawing Figures

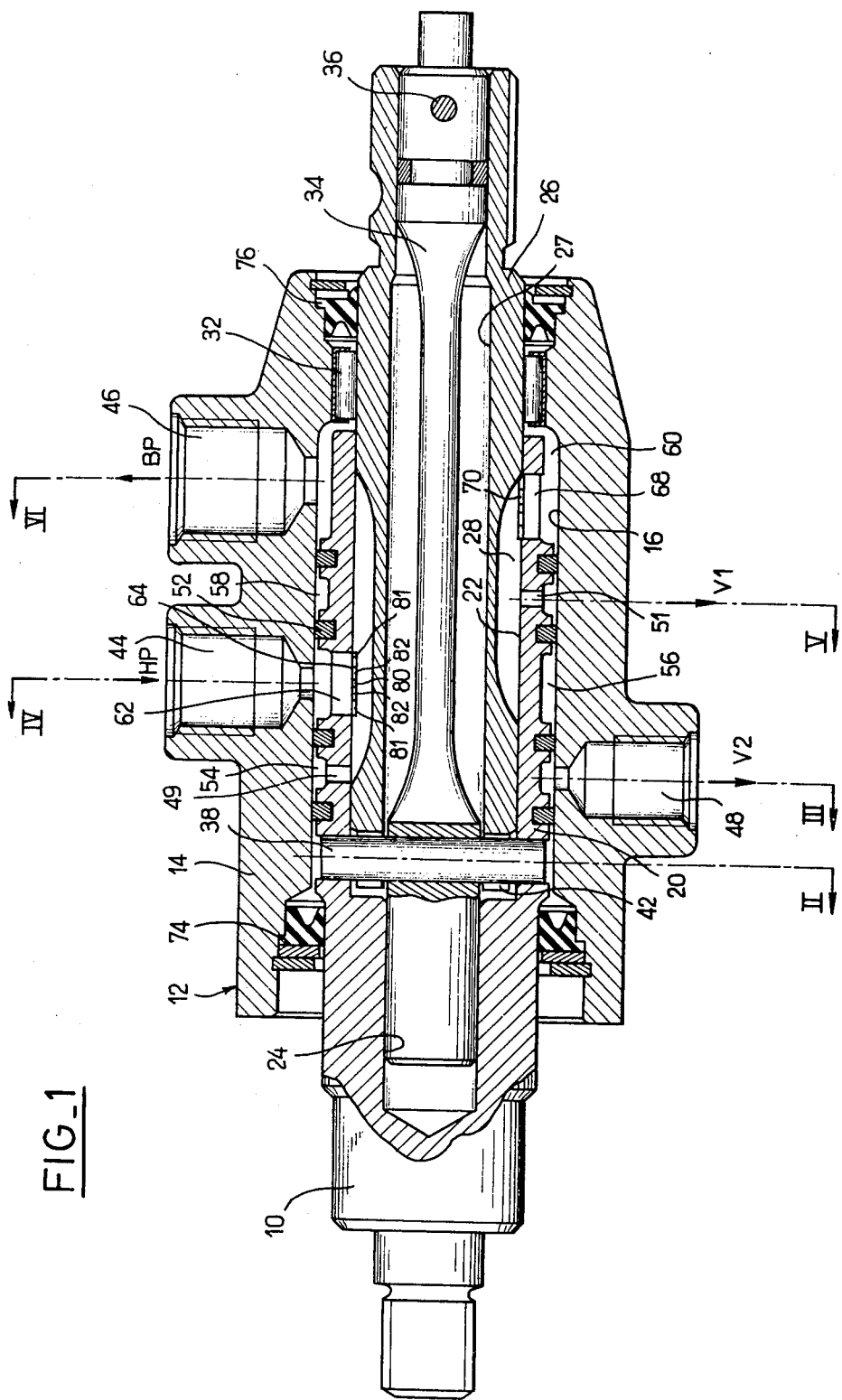
FIG_1

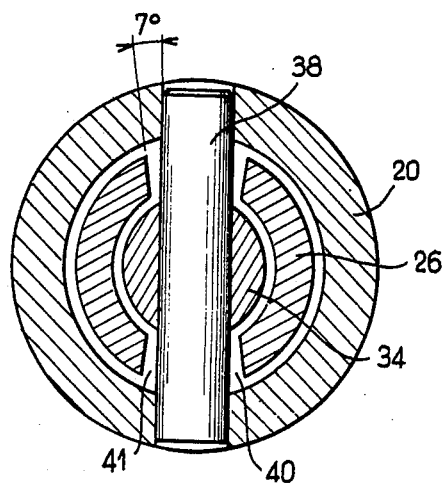
FIG_2
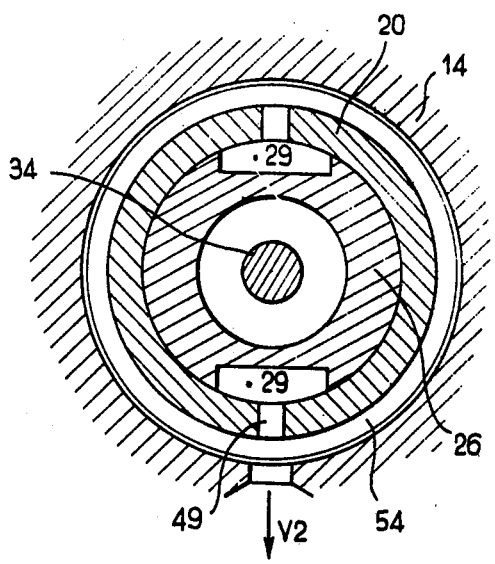
FIG_3
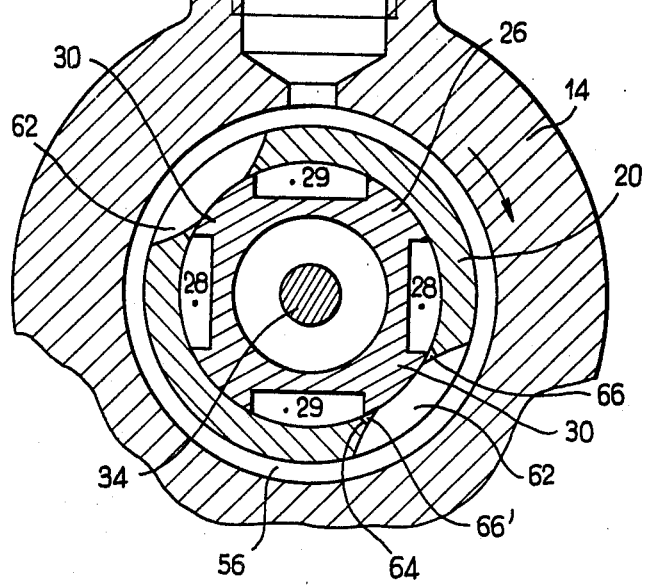
FIG_4

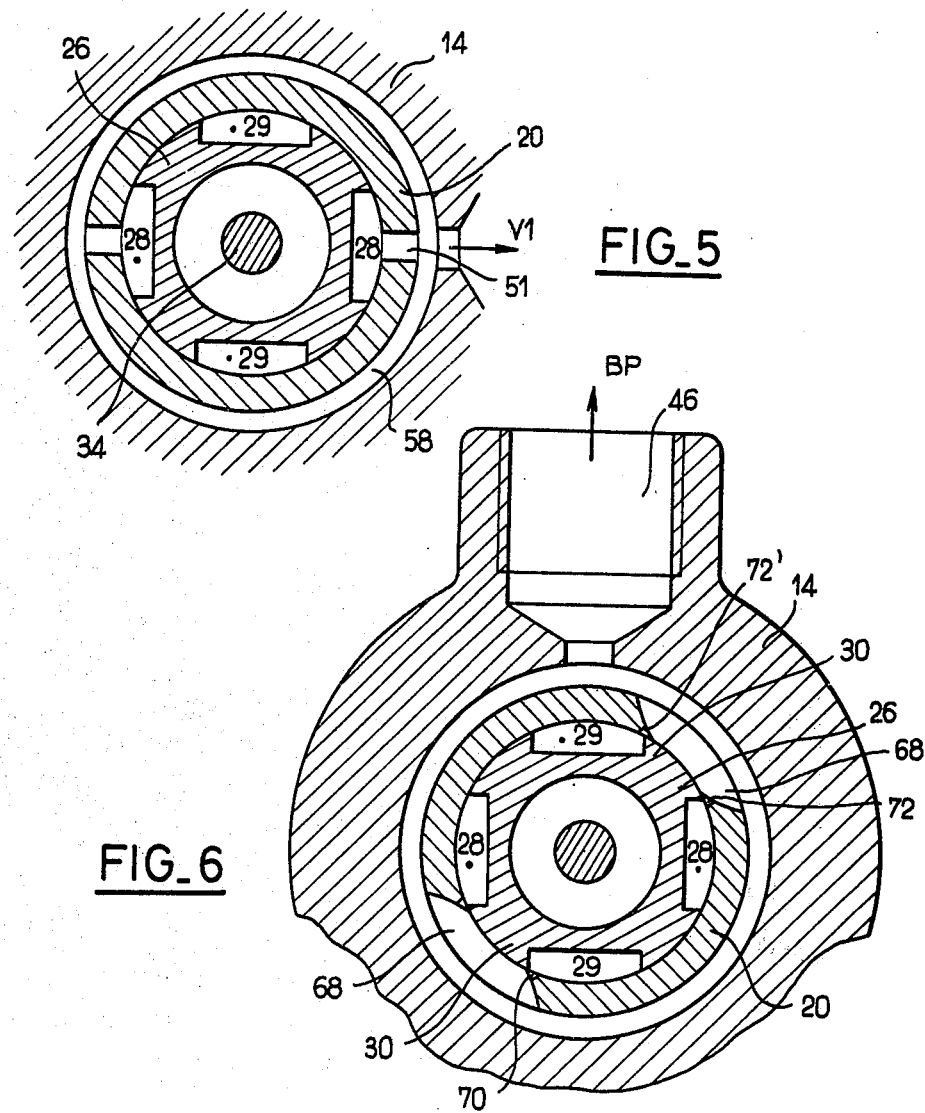
FIG_5
FIG_6
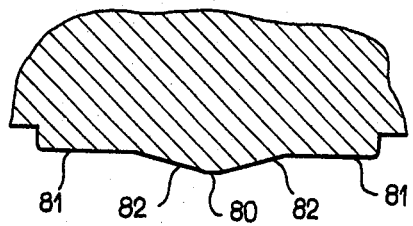
FIG_7

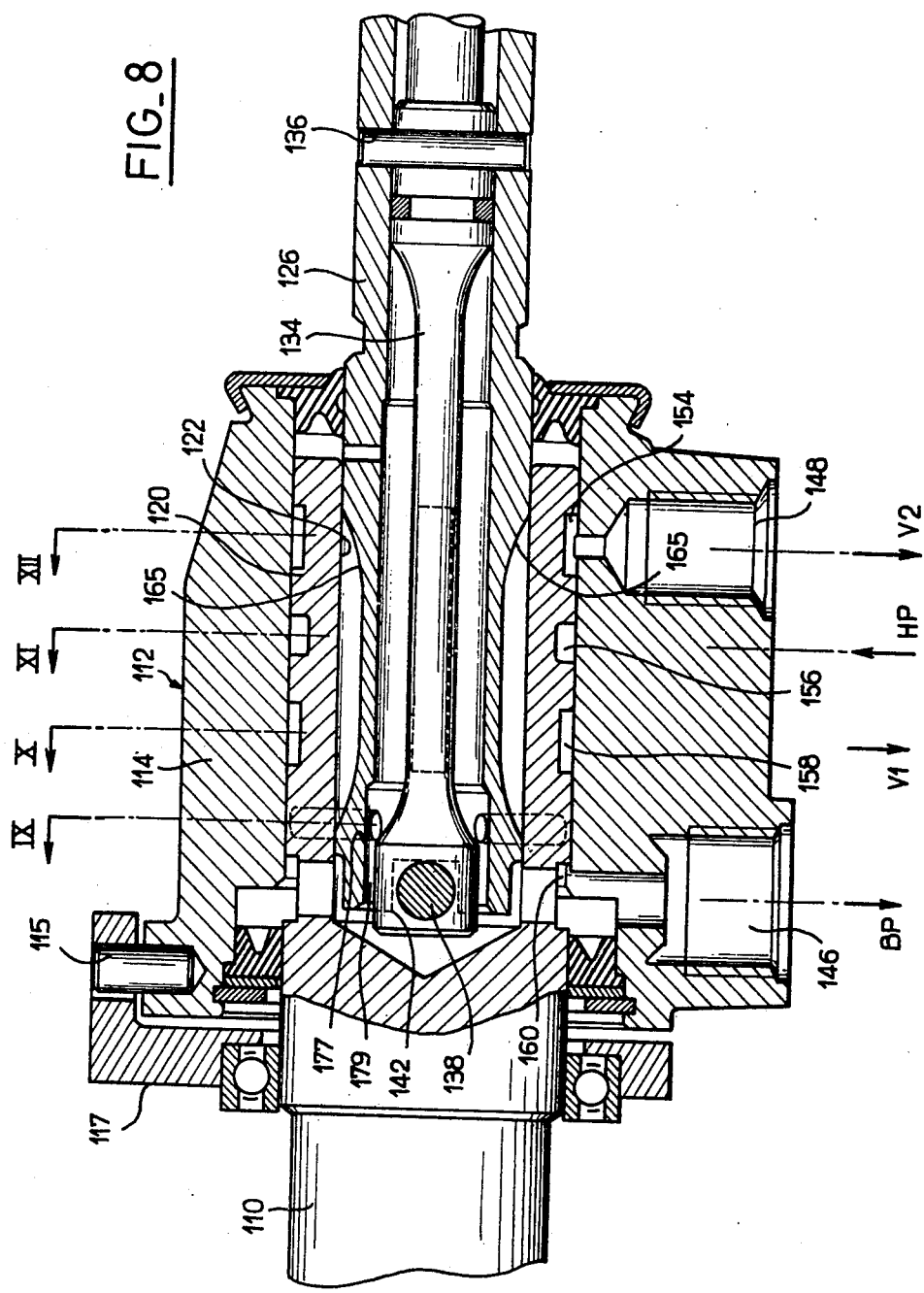
FIG_8

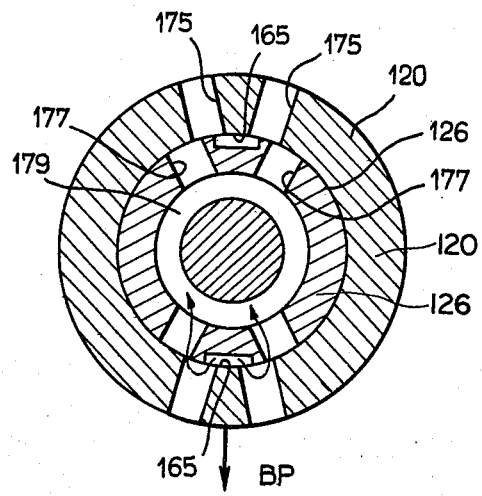
FIG_9
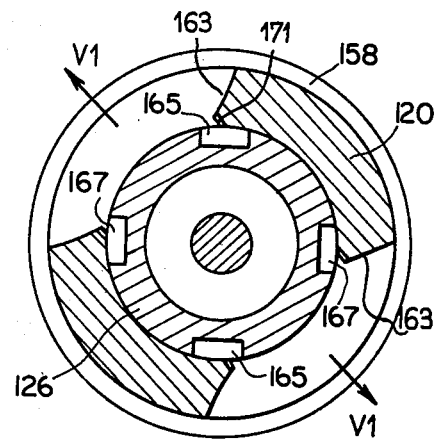
FIG_10
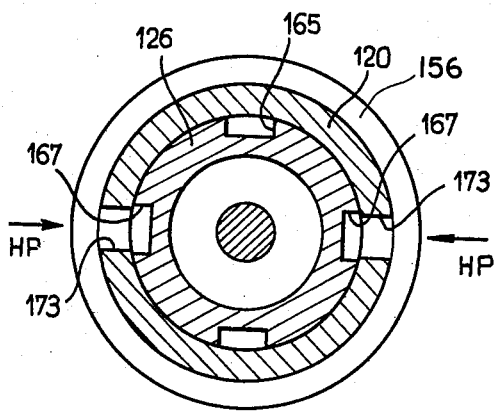
FIG_11
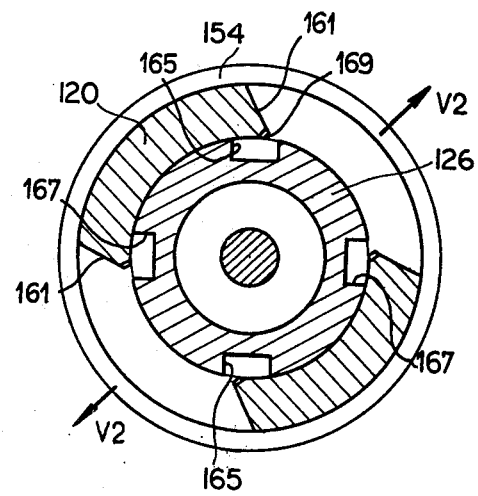
FIG_12

DEVICE FOR HYDRAULICALLY ASSISTED STEERING

The invention refers to a device for hydraulically assisted steering of the type having a rotary regulator, for a motor vehicle.

From the British Pat. No. 985 230 a device is known for the hydraulically assisted steering of a motor vehicle, comprising a steering control member extended by a regulator sleeve, a rotor of generally tubular form arranged inside the sleeve, a torsion-bar housed inside the rotor and having one end fixed to the rotor and the other end fixed to the steering control member and a hydraulic circuit for generating a control quantity in response to an angular displacement imposed upon the rotor.

The invention is first aimed at a device of the above type in which the adaptation of the hydraulic circuit to a given law of variation of the control quantity does not raise any difficulties and in which the members of the hydraulic circuit may be produced in a simple manner.

Another problem lies in the fact, that in such a device, flow noise has been found in highway driving, due to cavitation phenomena. Noise persistently audible to the user is disagreable and the present invention is aimed at reducing this flow noise very substantially.

Accordingly, the invention firstly concerns a device for hydraulically assisted steering of a motor vehicle comprising a steering control member extended by a regulator sleeve, a rotor of generally tubular form arranged inside the sleeve, a torsion-bar housed inside the rotor and having one end fixed to the rotor and the other end fixed to the steering control member and a hydraulic circuit for generating a control quantity in response to an angular displacement imposed upon the rotor, characterized by the fact that the regulator sleeve includes a first group of two pairs of diametrically opposed passage means, the pairs being offset axially and angularly, that the rotor includes a second group of two pairs of passage means, each passage means of said second group being shaped such that it can communicate with two passage means belonging to two different pairs of said first group, a source of high pressure and a drain being permanently connected to a pair of passage means of one group, respectively, the arrangement being such that an angular displacement $\theta$ of the rotor causes an unbalance $\Delta p$ between the respective pressures prevailing in the pairs of passage means of the other group, and that the edges of passage means of at least one group directed along the axis of the sleeve have a non-rectilinear profile defined as a function of the characteristic $\Delta p = f(\theta)$ desired.

The passage means of the sleeve may have the form of special orifices described herebelow and the passage means of the rotor may be axial grooves. According to a first embodiment of the device, said high pressure source and said drain are respectively connected to a pair of said orifices of said sleeve. According to a second embodiment of the device, said high pressure source and said drain are respectively connected to a pair of said grooves of said rotor.

In an advantageous embodiment the edges of the orifices have the look of a truncated wedge.

According to a second aim of the invention, the gap lying between the torsion-bar and the rotor communicates with the drain and for connecting one of the pairs of grooves to the said gap there is provided for each groove regulator means for putting the groove and the said gap into communication, which are arranged in order to generate a back-pressure in the groove in the event of angular movement of the rotor.

The creation at the time of a steering action, of a back-pressure in the grooves connected to the drain results in reducing very strongly the cavitations in these grooves and hence the flow noise.

Two embodiments of the device in accordance with the invention will now be described by referring to the attached drawing in which:

FIG. 1 represents an assisted-steering device in accordance with the invention with a steering control member.

FIG. 2 is a section along the plane II—II in FIG. 1.
FIG. 3 is a section along the plane III—III in FIG. 1.
FIG. 4 is a section along the plane IV—IV in FIG. 1.
FIG. 5 is a section along the plane V—V in FIG. 1.
FIG. 6 is a section along the plane VI—VI in FIG. 1.
FIG. 7 is a detail on a larger scale of one portion of the device.
FIG. 8 is a longitudinal section of another assisted-steering device in accordance with the invention.
FIG. 9 is a cross-section along the plane IX—IX in FIG. 8.
FIG. 10 is a cross-section along the plane X—X in FIG. 8.
FIG. 11 is a cross-section along the plane XI—XI in FIG. 8.
FIG. 12 is a cross-section along the plane XII—XII in FIG. 8.

Referring to FIG. 1 the numerical reference 10 has been used to designate a steering control member consisting in the embodiment described, of the pinion of a rack-and-pinion steering, and the reference 12 to designate a rotary regulator for the device for hydraulically assisted steering.

The rotary regulator comprises a casing 14 in which is formed a bore 16. In the bore 16 is mounted an extension 20 from the pinion 10. This extension 20 is equipped with a bore 22 coaxial with the bore 16 and forms the regulator sleeve.

In the bore 22 a rotor 26 is mounted to be able to rotate, which in turn has a bore 27 passing through it. In the bore 27 is mounted a torsion-bar 34 the outer end (on the right in FIG. 1) of which is fixed to the rotor 26 by a pin 36. At the end of it located on the inside (on the left in FIG. 1) the torsion-bar 34 enters a blind bore 24 arranged in the pinion 10 in continuation of the bore 22 and of smaller diameter, and a pin 38 fixes the inner end of the torsion-bar 34 to the pinion 10. Thus the rotor 26 becomes connected elastically to the pinion 10.

A mechanical stop is provided in order to lock the rotor 26 to the pinion 10 in the case of failure of the hydraulic circuit, thanks to the arrangement represented in FIG. 2. The rotor 26 in fact extends as far as the pin 38 which passes through a notch 42 arranged in the rotor with a clearance 40 which corresponds with a predetermined angular displacement between the pinion 10 and the rotor 26.

This arrangement likewise offers the advantage of allowing a wider tolerance between the pinion 10 and the torsion-bar 34 which is held both by the pinion and by the rotor 26.

In addition a bearing 32 consisting of a needle roller bearing in the example shown, is mounted between the casing 14 and the rotor 26 in order to support the latter in rotation. It must, however, be emphasized that this bearing is not always indispensable and might in certain cases be omitted because, taking into account the one-piece production of the pinion 10 and the sleeve 20, the latter plays the part of a bearing for the rotor 26.

The casing 14 further includes on the one hand a high pressure orifice 44 and a low pressure orifice 46 connected respectively in service to a constant-output pump and to a tank and on the other hand two orifices only one of which is represented in the drawing, with the reference 48, connected in service to the respective compartments $V_1$ and $V_2$ of an auxiliary jack not shown here, which communicate with ducts 49 and 51 formed in the sleeve 20.

The regulator sleeve 20 defines with the casing four annular chambers, 54, 56, 58, 60, and seals 52 mounted on the sleeve ensure oil-tightness between the adjacent chambers. The chamber 54 is connected to the compartment $V_2$ of the jack via the duct 49; the chamber 56 is connected to the source of pressure via the orifice 44; the chamber 58 is connected to the compartment $V_1$ via the duct 51, and the chamber 60 is connected to the tank via the orifice 46.

The regulator sleeve 20 includes in addition at the level of the annular chamber 56 two orifices 62 diametrically opposed as shown in FIG. 4 and of rectangular section, and at the level of the chamber 60 two other orifices 68 (see FIG. 6) diametrically opposed and of identical shape, but offset by 90° with respect to the orifices 62.

Finally the rotor 26 exhibits on its periphery four equidistant grooves distributed in two pairs of diametrically opposite grooves 28, 29 as shown in particular in FIG. 4. Consequently these grooves define four angular bearing surfaces 30.

The edges 64 of the orifices 62 which are directed along the axis of the sleeve 20 define with the angular bearing surfaces 30 areas of flow 66, 66' for the hydraulic fluid and the edges 64 exhibit a profile designed so as to provide the valve characteristic required.

In FIG. 7 is shown an example of such a profile which comprises a leading section 80 and two trailing sections 81, parallel with the axis of the sleeve, and connecting sections 82 sloping with respect to this axis. It is clear that by modifying the characteristics of the profile one modifies the manner in which the areas of flow vary as a function of the angular displacement between the rotor 26 and the sleeve 20 and consequently the valve characteristic of the device.

In the same way the edges 70 of the orifices 68 which are directed along the axis of the sleeve define with the bearing surfaces 30 areas of flow 72, 72' for the hydraulic fluid and exhibit an identical profile.

It will be observed likewise that the oil-tightness of the hydraulic circuit to the outside is ensured by the seals 74 and 76 mounted in stepped bores of suitable shape formed at the two ends of the bore 16 in the casing 14, retained by circlips.

The operation of the regulator described above is as follows.

In the rest position represented in FIG. 1 the passages 66, 66' and 72, 72' have the same area. The same pressure prevails in the grooves 28 and 29, this pressure being substantially equal to half the pressure supplied by the pump and arriving through the orifice 44.

When a steering torque to the right is applied it shows as a movement of rotation of the rotor 26 in the clockwise direction, but the sleeve 20 does not turn in view of the elasticity of the bar 34 in torsion.

This relative displacement between the sleeve 20 and the rotor 26 has the effect of increasing the area of the passages 66 opening into the grooves 28 (FIG. 4) and of reducing on the contrary the area of the passages 72 opening into the grooves 28 (FIG. 6).

The effect is the opposite for the passages 66' opening into the grooves 29, the area of which is reduced, whilst the area of the passages 72' opening into the grooves 29 increases.

The result is that the pressure increases in the grooves 28 in communication with the compartment $V_1$ via the ducts 51, and that it is reduced in the grooves 29 in communication with the compartment $V_2$ via the ducts 49.

The difference in pressure which is thus established between the compartments $V_1$ and $V_2$ of the auxiliary jack is a function of the steering torque applied and also as has been said, of the profile chosen for the edges 64 and 70.

In the case of steering to the left it is the opposite which occurs, that is to say, it is the pressure in the compartment $V_1$ which is reduced and the pressure in the compartment $V_2$ which increases and that leads to a movement in the opposite direction of the movable member of the jack.

It must be emphasized that the members of the hydraulic circuit described above are much simpler to produce than in the devices according to the state of the art. In particular the grooves 28 and 29 in the rotor may be machined by milling with standard tolerances and the orifices 62 and 68 formed in the sleeve 20 may be obtained by drifting or milling for the rough, followed by finishing produced by electro-erosion or by punching.

In FIG. 8 the reference 110 designates a steering control member consisting, for example, of the pinion of a rack-and-pinion steering and the reference 112 designates a rotary regulator for the device for hydraulically assisted steering.

The rotary regulator comprises a body 114 connected by a pin 115 to a flange 117 fixed to the rack housing (not shown).

The body 114 is equipped with a bore which receives an extension 120 of the pinion 110. The extension 120 has itself a bore 122 and forms the regulator sleeve.

In the bore 122 a rotor 126 is mounted to be able to rotate, which is moved in rotation when a steering action occurs. The rotor is tubular and receives a torsion-bar 134 the outer end (on the right in FIG. 8) is fixed to the rotor by a pin 136. At its inner end the torsion-bar 134 is fixed by a pin 138 to the pinion 110. Thus an elastic connection is produced between the rotor and the pinion 110.

The pin 138 passes with clearance through a notch 142 formed in the end of the rotor 126, with the result that the pinion 110 becomes locked in rotation to the rotor 126 beyond a certain angular displacement, which enables possible failure of the hydraulic circuit to be made good.

The regulator sleeve 120 has four annular chambers 154, 156, 158, 160 between which oil tightness is obtained by very accurate machining of the bearing surfaces in contact with the body 114.

The chamber 154 is connected to one of the compartments $V_2$ of an auxiliary jack via an orifice 148 formed in the body 114. The chamber 156 is connected to a source of pressure such as a constant-output pump (arrow HP) via an orifice not shown in FIG. 8. The chamber 158 is connected to the other compartment V₁ of the auxiliary jack via an orifice which is not shown. Finally, the chamber 160 is connected to a tank (arrow BP) through an orifice 146.

The regulator sleeve has in addition at the level of the chamber 154 connected to the compartment V₂, two orifices 161 diametrically opposite and of rectangular section as shown in FIG. 12, and at the level of the chamber 158 connected to the compartment V₁, two orifices 163 of identical shape but offset by 90° with respect to the orifices 161.

The rotor 126 has on the other hand on its outer periphery four equidistant longitudinal grooves 165, 167 as shown in FIGS. 10 to 12.

The edges 169 of the orifices 161 which are directed along the axis of the sleeve 120 exhibit a non-rectilinear profile such as that described in the first embodiment, which is defined in order to provide the valve characteristic desired. The edges 171 of the orifices 163 exhibit an identical profile.

The grooves 167 are connected permanently to the high-pressure source via radial ducts 173 arranged in the sleeve 120.

The grooves 165 are connected permanently to the tank BP in the following fashion. For each of the grooves two radial ducts 175 are arranged in the sleeve 120 in a symmetrical manner with respect to the groove if the rest position of the device is considered. These ducts communicate with the groove.

Two other ducts 177 are arranged in the rotor 126 on opposite sides of the groove 165 so as to communicate respectively with the ducts 175. These ducts 177 open into the gap 179 defined between the rotor 126 and the torsion-bar 134. The orientation between the grooves 165 and the ducts 175 is controlled by the rotation between the rotor and the sleeve, which, in turn, is limited by the torsion bar and the pin 138. Consequently, the ducts 175 will always be in communication with a duct 177, albeit somewhat limited. The path followed by the hydraulic liquid is indicated by the arrows in FIG. 9.

The gap 179 communicates finally with the annular chamber 160 through drilled hole 183.

The device described operates in the same way as the first embodiment.

When a steering torque is applied, for example, to the right the rotor 126 turns in the clockwise direction (in FIGS. 9-12) but the sleeve 120 does not turn, in view of the elasticity of the bar 134 in torsion.

This relative displacement between the rotor 126 and the sleeve 120 has the effect of increasing the area of flow between the grooves 167 and the orifices 163 (FIG. 10) and of reducing the area of flow between the grooves 167 and the orifices 161 (FIG. 12).

The effect is the opposite for the areas of flow between the grooves 165 on the one hand and between the orifices 161 and 163 on the other hand.

The grooves 167 being connected to the high pressure, the pressure increases in the orifices 163 in communication with the compartment V₁ and is reduced in the orifices 161 connected to the compartment V₂. The difference in pressure which results between the compartments V₁ and V₂ determines the force supplied by the auxiliary jack.

The regulator device composed of the pairs of ducts 175, 177, which connects the grooves 165 to the tank, acts so as to create a back-pressure inside the grooves 165 so as to reduce cavitation phenomena. In fact this device operates as a hydraulic Wheatstone Bridge and any angular displacement of the rotor 126 at the time of a steering action causes an increase in the pressure in the grooves 165.

Thus one succeeds in practically eliminating the flow noise for pressures in the jack compartments from 5 to 7 bars, corresponding with small steering angles in the normal driving of a vehicle. Noise becomes audible only at the time of manoeuvres for which considerable steering movements are made, the pressure then reaching 30 bars.

I claim:

1. A device for hydraulically assisted steering of a motor vehicle comprising a steering control member (110) extended by a regulator sleeve (120), a rotor (126) of generally tubular form arranged inside the sleeve (120), a torsion-bar (134) housed inside the rotor and having one end fixed to the rotor and the other end fixed to the steering control member and a hydraulic circuit for generating a control quantity in response to an angular displacement imposed upon the rotor, characterized by the fact that the regulator sleeve (120) includes a first group of two pairs of diametrically opposed passage means (161, 163), the pairs being offset axially and angularly, the rotor (126) includes a second group of two pairs of passage means (165, 167), each passage means (165 or 167) of said second group being shaped such that it can communicate with two passage means (161, 163) belonging to two different pairs of said first group, a source of high pressure (HP) and a drain (179, 160) being permanently connected to a pair of passage means (165, 167) of one group, respectively, the arrangement being such that an angular displacement θ of the rotor (126) causes an unbalance Δp between the respective pressures prevailing in the pairs of passage means (161, 163) of the other group, and the edges of passage means (161, 163) of the first group directed along the axis of the sleeve have a non-rectilinear profile defined as a function of the characteristic Δp=f (θ).

2. A device according to claim 1 wherein said high pressure source and said drain are respectively connected to a pair of said orifices of said sleeve.

3. A device according to claim 1 wherein said high pressure source and said drain are respectively connected to a pair of grooves of said rotor.

4. A device according to claim 2, in which the edges of the orifices have the look of a truncated wedge.

5. A device according to claim 4, in which the portion thrust forward like a wedge is connected to the truncated portions to the rear by sloping portions.

6. A device according to claim 2, in which the connection between the steering control member and the end of the torsion-bar is produced by means of a diametral pin which passes through a notch formed with clearance in the rotor, so that the pin can thus ensure mechanical connection between the rotor and the steering control member in case of need.

7. A device according to claim 3, wherein a gap lying between the torsion-bar and the rotor communicates with the drain and for connecting one of the pairs of grooves to the said gap there is provided for each groove regulator means for putting the groove and the said gap into communication, which are arranged in order to generate a back-pressure in the groove in the event of angular movement of the rotor.

8. A device according to claim 7, characterized by the fact that the regulator means comprise a first pair of ducts formed in the rotor symmetrically with respect to the groove and connecting the said gap to the periphery of the rotor, and a second pair of ducts arranged in the regulator sleeve symmetrically with respect to the groove in the rest position of the rotor, these ducts respectively putting the ducts of the first pair into communication with the groove.

9. A device for hydraulically assisted steering of a motor vehicle comprising a steering control member extended by a regulator sleeve, a rotor of generally tubular form arranged inside the sleeve, a torsion-bar housed inside the rotor and having one end fixed to the rotor and the other end fixed to the steering control member and a hydraulic circuit for generating a control quantity in response to an angular displacement imposed upon the rotor, characterized by the fact that the regulator sleeve includes a first group of two pairs of diametrically opposed passage means, the pairs being offset axially and angularly, that the rotor includes a second group of two pairs of passage means, each passage means of said second group being shaped such that it can communicate with two passage means belonging to two different pairs of said first group, a source of high pressure and a drain being permanently connected to a pair of passage means of one group, respectively, the arrangement being such that an angular displacement $\theta$ of the rotor causes an unbalance $\Delta p$ between the respective pressures prevailing in the pairs of passage means of the other group, and that the edges of passage means of at least one group directed along the axis of the sleeve have a non-rectilinear profile defined as a function of the characteristic $\Delta p = f(\theta)$, the profile defining leading sections on the axial edges of each passage means, and the leading sections approaching each other.

* * * * *